(12) United States Patent
Belli et al.

(10) Patent No.: US 7,744,950 B2
(45) Date of Patent: Jun. 29, 2010

(54) PROCESS FOR PRODUCING A CABLE WITH A RECYCLABLE COATING COMPRISING A THERMOPLASTIC POLYMER AND A DIELECTRIC LIQUID

(75) Inventors: Sergio Belli, Leghorn (IT); Alberto Bareggi, Milan (IT); Gaia Dell'Anna, Milan (IT); Pier Luigi Folcini, Lissone (IT); Cristiana Scelza, Angellaro di Vallo della Lucania (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 835 days.

(21) Appl. No.: 10/433,426

(22) PCT Filed: Nov. 23, 2001

(86) PCT No.: PCT/EP01/13667

§ 371 (c)(1),
(2), (4) Date: Dec. 15, 2003

(87) PCT Pub. No.: WO02/47092

PCT Pub. Date: Jun. 13, 2002

(65) Prior Publication Data

US 2004/0091631 A1    May 13, 2004

Related U.S. Application Data

(60) Provisional application No. 60/255,082, filed on Dec. 14, 2000.

(30) Foreign Application Priority Data

Dec. 6, 2000 (EP) ................... 00126737

(51) Int. Cl.
*B05D 5/12* (2006.01)
(52) U.S. Cl. ............ 427/117; 427/120; 427/356; 427/358
(58) Field of Classification Search ......... 427/117–120, 427/356
See application file for complete search history.

(56) References Cited

U.S. PATENT DOCUMENTS 3,928,705 A * 12/1975 Loft et al. ........... 174/25 C
4,060,583 A * 11/1977 Groves et al. ........ 264/272.13
4,543,207 A    9/1985 Sato et al.
4,621,302 A   11/1986 Sato et al.

(Continued)

FOREIGN PATENT DOCUMENTS

EP    0 110 677 A1   6/1984

(Continued)

*Primary Examiner*—Brian K Talbot
(74) *Attorney, Agent, or Firm*—Finnegan, Henderson, Farabow, Garrett & Dunner, L.L.P.

(57) ABSTRACT

A process for producing a cable, such as, for medium-tension or high-tension power transmission or distribution, having at least one coating layer made of a thermoplastic polymer material. The process includes at least the following steps: (a) extruding a thermoplastic material of at least one thermoplastic polymer and at least one dielectric liquid; (b) passing the thermoplastic material through at least one static mixer; and (c) depositing and shaping the thermoplastic material around a conductor belonging to the cable so as to obtain a layer of thermoplastic coating on the conductor.

24 Claims, 3 Drawing Sheets

U.S. PATENT DOCUMENTS

| | | | |
|---|---|---|---|
| 4,716,000 A * | 12/1987 | Kerschbaum et al. | 264/83 |
| 4,943,685 A * | 7/1990 | Reynaert | 174/19 |
| 5,564,827 A | 10/1996 | Signer | |
| 5,913,324 A | 6/1999 | Signer | |
| 6,440,642 B1 * | 8/2002 | Shelnut et al. | 430/315 |
| 6,515,231 B1 * | 2/2003 | Strøbech et al. | 174/137 B |
| 6,824,870 B2 * | 11/2004 | Castellani et al. | 428/379 |
| 6,908,673 B2 * | 6/2005 | Castellani et al. | 428/379 |
| 2003/0008143 A1 | 1/2003 | Castellani et al. | |

FOREIGN PATENT DOCUMENTS

| | | |
|---|---|---|
| EP | 0 893 801 A1 | 1/1999 |
| EP | 0 893 802 A1 | 1/1999 |
| EP | 0 987 718 A1 | 3/2000 |
| WO | WO 96/23311 | 8/1996 |
| WO | WO 98/32137 * | 7/1998 |
| WO | WO 98/52197 | 11/1998 |
| WO | WO 99/13477 * | 3/1999 |
| WO | WO 00/41187 | 7/2000 |
| WO | WO 02/03398 A1 | 1/2002 |
| WO | WO 02/27731 A1 | 4/2002 |

* cited by examiner

PROCESS FOR PRODUCING A CABLE WITH A RECYCLABLE COATING COMPRISING A THERMOPLASTIC POLYMER AND A DIELECTRIC LIQUID

CROSS REFERENCE TO RELATED APPLICATIONS

This application is a national phase application based on PCT/EP01/13667, filed Nov. 23, 2001, the content of which is incorporated herein by reference, and claims the priority of European Patent Application No. 00126737.6, filed Dec. 6, 2000, the content of which is of which is incorporated herein by reference, and claims the benefit of U.S. Provisional Application No. 60/255,082, filed Dec. 14, 2000, the content of which is incorporated herein by reference.

BACKGROUND OF THE INVENTION

1. Field of the Invention

The present invention relates to a process for producing a cable, in particular for medium-tension or high-tension power transmission or distribution.

More particularly, the present invention relates to a process for producing a cable, preferably for medium-tension or high-tension power transmission or distribution, which has at least one coating layer made of a thermoplastic polymer material.

2. Description of the Related Art

The need for products that are highly environmentally friendly, obtained from materials that do not damage the environment, either during production or during use, and that are readily recyclable at the end of their life, is particularly felt even in the sector of power cables, telecommunications cables, data transmission cables and/or combined power/telecommunications cables.

However, the use of environmentally friendly materials is decidedly conditioned by the need to limit the costs and yet maintain performances, under the most common working conditions, that are equivalent to or even better than those of conventional materials.

In the sector of medium-tension or high-tension power transmission cables, the different coatings, which surround the conductor commonly consist of a crosslinked polymer material based on polyolefins, in particular crosslinked polyethylene (XLPE) or ethylene/propylene (EPR) or ethylene/propylene/diene (EPDM) elastomeric copolymers, which are also crosslinked. The crosslinking, carried out after the step of extruding the polymer material around the conductor, gives said material satisfactory mechanical performances, even under hot conditions in continuous use and under conditions of current overload. The polymer material is usually crosslinked via a radical route, by adding organic peroxides, or via a silane route, by means of introducing onto the polyolefin chains hydrolysable silane groups which, in the presence of water and of a suitable condensation catalyst give rise to the crosslinking.

However, it is well known that crosslinked materials are not recyclable, as a result of which both the process wastes and the cable coating material at the end of its life can be disposed of only by incineration.

Electrical cables are also known which have an insulation consisting of a multilayer winding of a paper or paper/polypropylene laminate impregnated with very large amounts of a dielectric liquid (commonly known as bulk-impregnated cables or oil-filled cables). By completely filling the spaces present inside the multilayer winding, the dielectric liquid prevents the occurrence of partial discharges and thus perforation of the electrical insulation. Dielectric liquids that are commonly used include products such as, for example: mineral oils, polybutenes, alkylbenzenes and the like (see for example patents U.S. Pat. Nos. 4,543,207, 4,621,302, EP-A-0 987 718 and WO 98/32137).

However, it is known that bulk-impregnated cables have many drawbacks compared with cables with extruded insulation, as a result of which their use is currently restricted to specific fields of application, in particular to the production of high-tension and ultra-high-tension direct-current transmission lines, both for terrestrial installations and, above all, for underwater installations. Specifically, the production of bulk-impregnated cables is very complex and expensive, not only because of the high cost of the laminates, but also because of the difficulties inherent to the winding steps of the laminate and its subsequent impregnation with the dielectric liquid. In particular, the dielectric liquids used are required to have a low viscosity under cold conditions so as to allow high-speed and uniform impregnation, and at the same time they are required to have little tendency towards migration during the laying and functioning of the cable, so as to avoid losses of said liquid from the cable ends or due to breakage. In addition, bulk-impregnated cables are not recyclable and their use is limited to working temperatures lower than 90° C.

In the context of power cables with a non-crosslinked extruded coating, the use of thermoplastic materials of different kinds has been proposed in the prior art.

For example, patent application WO 96/23311 discloses a low-voltage, high-current cable in which the insulating coating, the inner sheath and the outer sheath are made of the same non-crosslinked polymer material, coloured black by addition of carbon black. The use of the same material in the different layers does not require the abovementioned components to be separated in a recycling process. For a maximum working temperature of 90° C., the possibility of using heterogeneous thermoplastic elastomers consisting of a polypropylene matrix in which is dispersed an elastomeric phase consisting of EPR or EPDM copolymers is indicated.

Patent application EP-0 893 801, in the name of the Applicant, discloses a cable comprising a conductor and one or more coating layers, in which at least one of said coating layers comprises, as non-crosslinked base polymer material, a blend comprising: (a) a crystalline propylene homopolymer or copolymer; and (b) an elastomeric ethylene copolymer with at least one α-olefin containing from 3 to 12 carbon atoms, and optionally with a diene; said copolymer (b) being characterized by a 200% tension set value (measured at 20° C. for 1 minute according to ASTM standard D 412) of less than 30%.

Patent application EP-A-0 893 802, in the name of the Applicant, discloses a cable comprising a conductor and one or more coating layers, in which at least one of said coating layers comprises, as non-crosslinked base polymer material, a blend comprising: (a) a crystalline propylene homopolymer or copolymer; and (b) a copolymer of ethylene with at least one α-olefin containing from 4 to 12 carbon atoms, and optionally with a diene; said copolymer (b) being characterized by a density of between 0.90 and 0.86 g/cm$^3$, and by a composition distribution index, defined as the percentage by weight of the copolymer molecules having an α-olefin content which is not more than 50% of the total average molar content of α-olefin, of greater than 45%.

Patent application WO 00/41187, in the name of the Applicant, discloses a cable comprising a conductor and at least one coating layer based on a non-crosslinked polymer material comprising a heterogeneous copolymer having an elastomeric phase based on ethylene copolymerized with an α-olefin and a thermoplastic phase based on polypropylene. The elastomeric phase in said heterogeneous copolymer represents at least 45% by weight relative to the total weight of the heterogeneous copolymer, and the heterogeneous copolymer is substantially free of crystallinity derived from polyethylene blocks. The elastomeric phase preferably consists of an elastomeric copolymer of ethylene and propylene which comprises from 15% to 50% by weight of ethylene and from 50% to 85% by weight of propylene, relative to the weight of the elastomeric phase.

Patent application WO 99/13477 discloses an insulating material consisting of a thermoplastic polymer forming a continuous phase which incorporates a liquid or readily fusible dielectric, which forms a mobile interpenetrating phase in the solid polymer structure. The weight ratio between the thermoplastic polymer and the dielectric is between 95:5 and 25:75. The insulating material can be produced by hot-blending the two components in a batchwise or continuous manner (for example by means of an extruder). The resulting blend is then granulated and used as insulating material for the production of a high-tension electrical cable by means of extrusion around a conductor. The material can be used either in thermoplastic form or in crosslinked form. Among the thermoplastic polymers the following are indicated: polyolefins, polyacetates, cellulose polymers, polyesters, polyketones, polyacrylates, polyamides and polyamines. It is particularly suggested to use polymers of low crystallinity. The dielectric is preferably a synthetic or mineral oil, of low or high viscosity, in particular a polyisobutene oil, naphthenic oil, polyaromatic oil, α-olefinic oil or silicone oil.

The Applicant believes, however, that the technical problem of obtaining an electrical cable with a coating consisting of a thermoplastic polymer material which has mechanical and electrical properties that are comparable with those of cables with an insulating coating made of crosslinked material, remains to be solved. In particular, the Applicant set itself the problem of producing a cable with a non-crosslinked insulating coating which has good flexibility and high mechanical strength under both hot and cold conditions, and at the same time high dielectric rigidity, without using potentially pollutant products during the life cycle of the cable, that is to say from its production to its disposal.

In view of the abovementioned problem, the Applicant has found that although the addition of dielectric liquids to thermoplastic polymer materials significantly increases the electrical properties of the material (in particular the dielectric rigidity), it presents many problems from the point of view of industrial implementation.

Specifically, the Applicant believes that the dielectric liquid added to the thermoplastic polymer material needs to maintain the properties of the material (thermomechanical properties, ease of handling) without giving rise to phenomena of exudation of said dielectric liquid. In addition, the dielectric liquid should distribute itself uniformly within the material, so as to ensure high electrical performances throughout its thickness. For example, when the coating made of thermoplastic polymer material is the insulating coating, it is important that the dielectric liquid should distribute uniformly itself throughout the coating thickness and should be present, in particular, in the interface zones between the inner and outer semiconductive layers usually present in a medium-tension and/or high-tension electrical power transmission and/or distribution cable. In this way, the resulting cable can ensure substantially constant performances over time, and thus a high level of reliability, even at elevated working temperatures (of at least 80° C., preferably of at least 90° C.).

In particular, the Applicant has found that the action of mixing the dielectric liquid into the thermoplastic material, which can take place during an extrusion process, does not make it possible to obtain a coating with a substantially homogeneous distribution of the dielectric liquid throughout its thickness. Specifically, the dielectric liquid tends to become concentrated in the inner zones of said coating, to the detriment of the outermost zones, which are actually the zones that are most sensitive to partial discharges and, thus, to perforation.

SUMMARY OF THE INVENTION

The Applicant has now found that it is possible to produce a cable with at least one thermoplastic coating layer which includes a dielectric liquid distributed substantially uniformly throughout the thickness of said coating. This is obtained by means of a process which comprises extruding a thermoplastic material, comprising a thermoplastic polymer mixed with a dielectric liquid, and passing the thermoplastic material through a static mixer. Next, the material is deposited around a conductor by conventional techniques, for example by means of an extrusion head. In this way, a cable is obtained which is suitable in particular for electrical power transmission and/or distribution, having a thermoplastic coating of high dielectric rigidity which ensures substantially constant performances over time, and thus high reliability.

In accordance with the present invention, the expression "cable conductor" means a conductive element per se, in elongate form and preferably made of metal, or a conductive element coated with a semiconductive layer. As stated earlier, the latter solution, which involves the use of a semiconductive layer both inside and outside the insulating layer, is typically used for electrical cables for medium-tension and/or high-tension power transmission and/or distribution.

In a first aspect, the present invention thus relates to a process for producing a cable provided with at least one thermoplastic coating, which comprises:

extruding a thermoplastic material comprising at least one thermoplastic polymer and at least one dielectric liquid;

passing said thermoplastic material through at least one static mixer;

depositing and shaping said thermoplastic material around a conductor so as to obtain a thermoplastic coating layer on said conductor.

According to a first embodiment, said coating layer is a layer of electrical insulation.

According to another embodiment, said coating layer is a semiconductive layer.

According to a preferred embodiment, the dielectric liquid is added to the thermoplastic polymer when said polymer is in the molten state.

The extrusion step according to the process of the present invention, carried out in an extruder which is known per se, generally comprises the following sub-steps:

feeding the thermoplastic polymer into at least one extruder;

conveying the thermoplastic polymer through said at least one extruder;

plasticizing the thermoplastic polymer travelling through said at least one extruder.

The addition of the dielectric liquid to the thermoplastic polymer preferably takes place by injecting the liquid into the extruder, preferably in a zone of the extruder in which the polymer is in molten state, i.e. already plasticized, in particular in a downstream zone of the extruder. This solution makes it possible to meter out the dielectric liquid accurately and to obtain excellent distribution of this liquid in the thermoplastic polymer. At the same time, the addition of the dielectric liquid to the already plasticized polymer ensures stability to the extrusion process, since the presence of dielectric liquid in the early extrusion steps, when the polymer is not yet molten, can cause irregularities in the movement of the material through the extruder—on account of the lubricant action brought about by this liquid.

Preferably, the addition of the dielectric liquid to the thermoplastic polymer inside the extruder takes place in at least two separate points so as to distribute the dielectric liquid as uniformly as possible in the thermoplastic polymer.

According to another embodiment, the dielectric liquid is added to the thermoplastic polymer when said polymer is in the solid state.

The addition of the dielectric liquid to the thermoplastic polymer in the solid state can take place, for example: a) during the abovementioned feeding sub-step; b) before said feeding sub-step, that is to say before the polymer is fed into the extruder; or c) in a zone of the extruder in which the thermoplastic polymer is in the solid state.

In case b) mentioned above, the addition of the dielectric liquid can take place, for example, during a prior step of compounding the polymer in a mixer (of batchwise or continuous type), or by impregnating the polymer in the form of granules or powder.

At the end of the extrusion step and before the step of depositing and shaping the coating around the conductor, the thermoplastic material is preferably subjected to a filtration step, so as to remove any impurities, in particular metal particles, which can impair the electrical properties of this material. The filtration step can be carried out between the extrusion step and the step of passing the thermoplastic material through the static mixer, or can be carried out between the step of passing the thermoplastic material through the static mixer and the step of depositing and shaping the material around the conductor. The filtration step can be carried out by using known devices, for example mesh filters or the like.

The static mixer which can be used in the process according to the present invention is generally a blending device, which is known per se in the art, containing no moving parts, in which the blending action is obtained by forcing of the material to be blended past stationary blending elements. By diverting the direction of the flow or constraining this flow to pass through preferred channels, said blending elements carry out numerous subdivisions and recombinations of the flow, thus making it possible to obtain the desired uniformity of properties within the material leaving this mixer.

The static mixer is preferably a device which is specially designed for blending highly viscous fluids and commonly used in processes of injection-moulding of plastics, for example a static mixer as disclosed in patent U.S. Pat. No. 5,564,827. In general, this type of mixer comprises static blending elements in a single piece, that is to say without welds or joints, so as to avoid as far as is possible any deformations and/or ruptures inside the mixer, even when the material to be blended is highly viscous and thus requires high extrusion pressures.

It is important to emphasize that the use of a static mixer in the process according to the present invention does not involve any drawbacks relating to the handling of the plant or the quality of the coating obtained. Specifically, the material which passes through the static mixer contains no crosslinking agents, and thus, unlike the crosslinkable materials commonly used for coating power cables, does not give rise to scorching phenomena due to the presence of possible zones of stagnation of the material inside the static mixer.

The subsequent depositing and shaping step of the thermoplastic material around the conductor can be carried out according to known techniques, by using an extrusion head of conventional type. Preferably, the extrusion head is a triple head, so as to achieve a co-deposition of the three coating layers of the conductor (inner semiconductive layer, insulating layer and outer semiconductive layer) which are typically present in a medium-tension and/or high-tension cable.

In a second aspect, the present invention relates to a method for enhancing the electrical properties, in particular the dielectric rigidity, of a thermoplastic material comprising at least one thermoplastic polymer and at least one dielectric liquid, said method comprising the steps of: adding at least one dielectric liquid to the thermoplastic polymer, and passing said at least one thermoplastic polymer, to which said at least one dielectric liquid has been added, through at least one static mixer.

According to one preferred embodiment of the present invention, the thermoplastic material comprises a polyolefin.

Said polyolefin preferably has an elastic flexural modulus, measured according to ASTM standard D790 at ambient temperature, of from 30 to 1400 MPa and preferably from 60 to 1000 MPa.

Said polyolefin preferably has a melt flow index (MFI), measured at 230° C. under a 21.6 N load according to ASTM standard D1238/L, of from 0.05 to 10.0 dg/min and more preferably of from 0.5 to 5.0 dg/min.

Polyolefins that are-suitable for this purpose can preferably be chosen from:

(a) a high-density polyethylene (HDPE) with a density generally of between 0.93 g/cm$^3$ and 0.96 g/cm$^3$;

(b) a propylene homopolymer or a copolymer of propylene with at least one olefinic comonomer chosen from ethylene and an α-olefin other than propylene, said homopolymer or copolymer having a melting point greater than or equal to 140° C., preferably from 145 to 170° C., and a heat of fusion of from 30 to 100 J/g, preferably from 30 to 85 J/g.

When a copolymer of propylene with an olefinic comonomer is used, said comonomer is preferably present in an amount of less than or equal to 15 mol %, more preferably less than or equal to 10 mol %. The olefinic comonomer is, in particular, ethylene or an α-olefin of formula $CH_2$=CH—R, in which R is a linear or branched alkyl containing from 2 to 10 carbon atoms said α-olefin being chosen, for example, from: 1-butene, 1-pentene, 4-methyl-1-pentene, 1-hexene, 1-octene, 1-decene and 1-dodecene, and the like, or combinations thereof. Propylene/ethylene copolymers are particularly preferred.

According to one particularly preferred embodiment, the thermoplastic polymer is a polyolefin chosen from:

(1) a propylene homopolymer or a copolymer of propylene with at least one olefinic comonomer chosen from ethylene and an α-olefin other than propylene, having an elastic flexural modulus generally of between 30 and 900 MPa and preferably between 50 and 400 MPa;

(2) a heterogeneous copolymer comprising a thermoplastic phase based on propylene and an elastomeric phase based on ethylene copolymerized with an α-olefin, preferably with propylene, in which the elastomeric phase is present in an amount of at least 45% by weight relative to the total weight of the heterogeneous copolymer.

The homopolymers or copolymers falling within category (1) exhibit a homogeneous microscopic structure, i.e. a structure which is substantially free of heterogeneous phases dispersed in molecular domains greater than one micron. Specifically, said materials do not exhibit the optical phenomena typical of heterogeneous polymer materials, and in particular are characterized by improved transparency and reduced "stress whitening" of the material due to localized mechanical stresses.

Within category (1) mentioned above, particularly preferred is a propylene homopolymer or a copolymer of propylene with at least one olefinic comonomer chosen from ethylene and an α-olefin other than propylene, said homopolymer or copolymer having:

a melting point of from 140 to 165° C.;

a heat of fusion of from 30 to 80 J/g;

a fraction which is soluble in boiling diethyl ether, in an amount of less than or equal to 12% by weight, preferably from 1 to 10% by weight, having a heat of fusion of less than or equal to 4 J/g and preferably less than or equal to 2 J/g;

a fraction which is soluble in boiling n-heptane, in an amount of from 15 to 60% by weight and preferably from 20 to 50% by weight, having a heat of fusion of from 10 to 40 J/g and preferably from 15 to 30 J/g; and a fraction which is insoluble in boiling n-heptane, in an amount of from 40 to 85% by weight and preferably from 50 to 80% by weight, having a heat of Fusion of greater than or equal to 45 J/g and preferably from 50 to 95 J/g.

Further details regarding said materials and their use for coating cables are given in European patent application No. 99122840 filed on Nov. 17, 1999 in the name of the Applicant, which is incorporated herein by reference.

The heterogeneous copolymers falling within category (2) are thermoplastic elastomers obtained by block copolymerization of: (i) propylene, optionally containing smaller amounts of at least one olefinic comonomer chosen from ethylene and an α-olefin other than propylene; and then of: (ii) a blend of ethylene with an α-olefin, in particular propylene, and optionally with smaller portions of a diene. Said category of products is also commonly known as "reactor thermoplastic elastomers".

Within category (2) mentioned above, particularly preferred is a heterogeneous copolymer in which the elastomeric phase consists of an elastomeric copolymer of ethylene and propylene which comprises from 15 to 50% by weight of ethylene and from 50 to 85% by weight of propylene, relative to the weight of the elastomeric phase. Further details regarding said, materials and their use for coating cables are given in patent application WO 00/41187 in the name of the Applicant, which is incorporated herein by reference.

Products of category (1) are commercially available, for example, under the brand name Rexflex® from Huntsman Polymer Corp.

Products of category (2) are commercially available, for example, under the brand name Hifax® from Montell.

The base thermoplastic polymer as described above can be used as a mechanical blend with a polymer of low crystallinity, generally with a heat of fusion of less than 30 J/g, the main function of which is to increase the flexibility of the material. The amount of polymer of low crystallinity is generally less than 70% by weight, preferably between 20% and 60% by weight, relative to the total weight of the thermoplastic material.

The polymer of low crystallinity is preferably a copolymer of ethylene with an α-olefin containing from 3 to 12 carbon atoms, and optionally with a diene. The α-olefin is preferably chosen from: propylene, 1-hexene and 1-octene. When a diene comonomer is present, this generally contains from 4 to 20 carbon atoms and is preferably chosen from: linear conjugated or non-conjugated diolefins, for example 1,3-butadiene, 1,4-hexadiene or 1,6-octadiene, or mixtures thereof, and the like; monocyclic or polycyclic dienes, for example 1,4-cyclohexadiene, 5-ethylidene-2-norbornene, 5-methylene-2-norbornene, 5-vinyl-2-norbornene, or mixtures thereof, and the like.

Among the ethylene copolymers that are particularly preferred are:

(i) copolymers having the following monomer composition: 35-90 mol % of ethylene; 10-65 mol % of an α-olefin, preferably propylene; 0-10 mol % of a diene, preferably 1,4-hexadiene or 5-ethylidene-2-norbornene (EPR and EPDM rubbers fall within this category);

(ii) copolymers having the following monomer composition: 75-97 mol %, preferably 90-95 mol %, of ethylene; 3-25 mol %, preferably 5-10 mol %, of an α-olefin; 0-5 mol %, preferably 0-2 mol %, of a diene (for example ethylene/1-octene copolymers, such as the Engage® products from Dow-DuPont Elastomers).

The dielectric liquid which can be used to carry out the present invention is an aromatic and/or aliphatic oil generally having a dielectric constant of less than or equal to 8, preferably less than 3.5 (measured at 25° C. according to IEC standard 247).

The dielectric liquid preferably comprises:

(i) an alkylaryl hydrocarbon containing at least two, preferably at least three, non-fused aromatic rings and having a ratio between the number of aryl carbon atoms and the total number of carbon atoms of greater than or equal to 0.6, preferably greater than or equal to 0.7, as disclosed in the co-pending European patent application No. 00113661.3, filed on Jun. 28, 2000 in the name of the Applicant, which is incorporated by reference; or (ii) a diphenyl ether, which is unsubstituted or substituted with at least one linear or branched aliphatic, aromatic or mixed aliphatic and aromatic hydrocarbon radical, containing from 1 to 30 carbon atoms, preferably from 1 to 24 carbon atoms, as disclosed in the co-pending European patent application No. 00121110.1, filed on Sep. 28, 2000 in the name of the Applicant, which is incorporated herein by reference, or mixtures of (i) and (ii).

Even more preferably, the dielectric liquid according to the invention comprises at least one alkylaryl hydrocarbon containing at least three non-fused aromatic rings in an amount of not less than 10% by weight, relative to the total weight of the dielectric liquid.

Examples of alkylaryl hydrocarbons belonging to category (i) which can be used according to the present invention are: benzyltoluene, benzylxylene, (methylbenzyl)toluene, (methylbenzyl)xylene, dibenzyltoluene, dibenzylxylene, di(methylbenzyl)toluene, di(methylbenzyl)xylene, and the like, or mixtures thereof.

Examples of diphenyl ethers belonging to category (ii) which can be used according to the present invention are: phenyl tolyl ether, 2,3'-ditolyl ether, 2,2'-ditolyl ether, 2,4'-ditolyl ether, 3,3'-ditolyl ether, 3,4'-ditolyl ether, 4,4'-ditolyl ether, octadecyl diphenyl ether, and the like, or mixtures thereof.

The dielectric liquid which can be used to carry out the present invention has a predetermined viscosity such as to avoid rapid diffusion of the liquid through the insulating layer and thus outward migration of said liquid, and at the same time such as to allow it to be easily fed and blended into the polymer material. Generally, the dielectric liquid has a kinematic viscosity of from 1 to 500 mm$^2$/s and preferably from 5 to 100 mm$^2$/s (measured at 20° C. according to ISO standard 3104).

According to a further preferred aspect, the dielectric liquid has a hydrogen-absorbing capacity of greater than or equal to 5 mm³/min and preferably greater than or equal to 50 mm³/min (measured according to IEC standard 628-A).

According to a preferred aspect, to the dielectric liquid which is suitable for carrying out the present invention can be added, generally in an amount of less than or equal to 1% by weight relative to the weight of the liquid, an epoxy resin, which serves mainly to reduce the migration speed of the ions in an electric field, and thus the dielectric losses of the insulating material.

The weight ratio between the dielectric liquid and the thermoplastic polymer according to the invention is generally between 1:99 and 25:75, preferably between 2:98 and 20:80 and even more preferably between 3:97 and 15:85.

To carry out the process according to the invention, other conventional components can be added to the thermoplastic material, for example antioxidants, processing coadjuvants and water-tree retardants, and the like.

Conventional antioxidants that are suitable for this purpose are, for example, distearyl thiopropionate and pentaerythrityl tetrakis[3-(3,5-di-tert-butyl-4-hydroxyphenyl)propionate] and the like, or mixtures thereof.

Processing coadjuvants which can be added to the polymer base include, for example, calcium stearate, zinc stearate, stearic acid, paraffin wax, and the like, or mixtures thereof.

When it is desired to prepare a semiconductive layer, a conductive filler, in particular carbon black, is generally dispersed in the thermoplastic material, in an amount such as to give said material semiconductive properties (i.e. such as to obtain a resistivity of less than 5 Ohm*m at ambient temperature). This amount is generally between 5% and 80% by weight, preferably between 10% and 50% by weight, relative to the total weight of the mixture.

The possibility of using the same type of thermoplastic material both for the insulating layer and for the semiconductive layers is particularly advantageous in the production of medium-tension or high-tension cables, since it ensures optimal adhesion between adjacent layers and thus better electrical behaviour, especially at the interface between the insulating layer and the inner. semiconductive layer, in which the electric field and thus the risk of partial discharges are higher.

For the purposes of the present invention, the term "medium-tension" generally means a voltage of between 1 and 35 kV, while "high-tension" means voltages of greater than 35 kV.

Although the present description is mainly focused on the production of medium-tension or high-tension power transmission or distribution cables, the process according to the present invention can be used to prepare the insulating coating of electrical devices in general. In particular, the process can be used to produce cables of different type, for example low-tension cables, telecommunications cables or combined power/telecommunications cables, or to produce components of accessories used in the production of power lines, such as elastic sleeves for terminals or joints.

BRIEF DESCRIPTION OF THE DRAWINGS

Further details will be illustrated by the following detailed description, with reference to the attached drawing, in which.

DETAILED DESCRIPTION OF THE INVENTION

Figure 1:
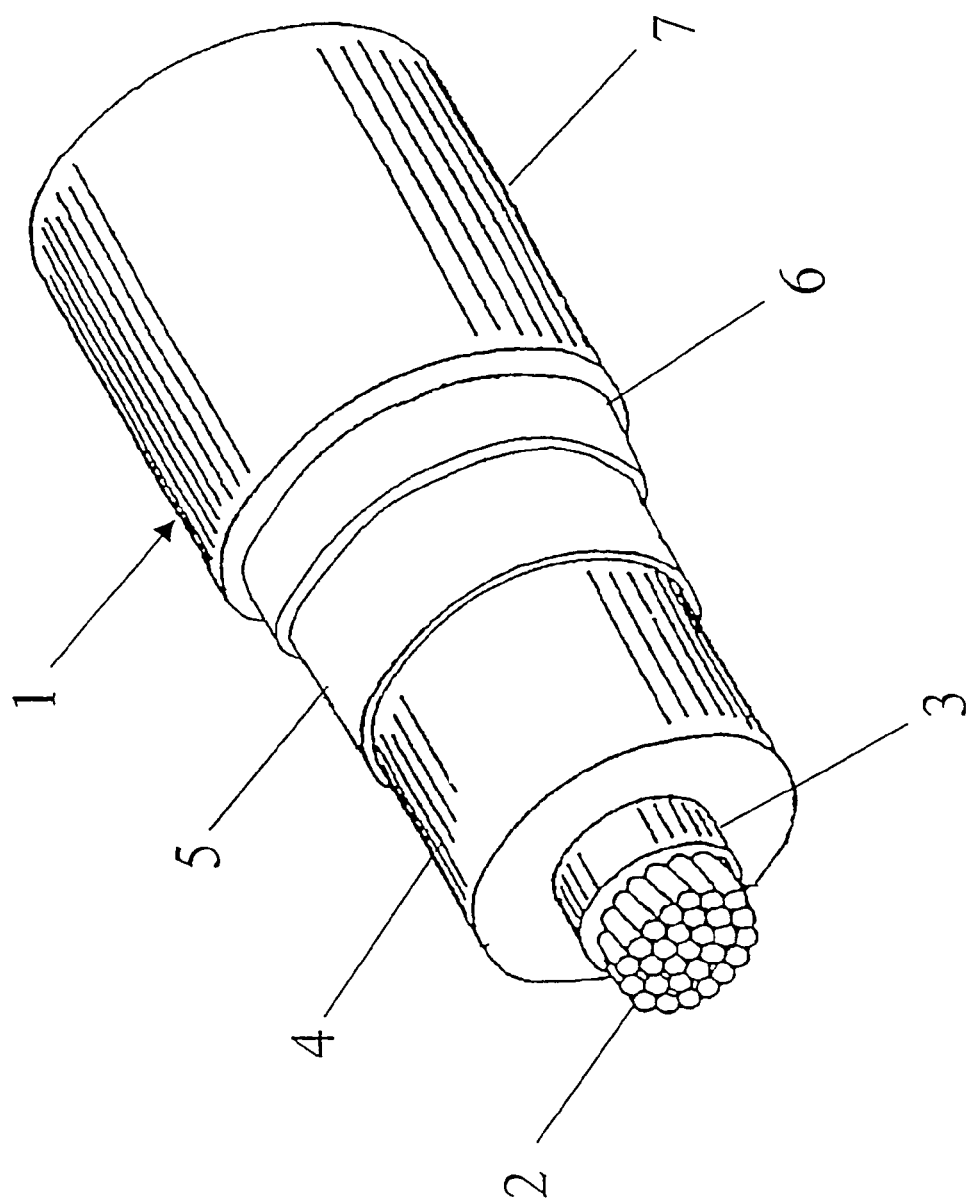
FIG. 1 is a perspective view of an electrical cable which is particularly suitable for medium tension or high tension, and which can be prepared according to the present invention.

In FIG. 1, the cable 1 comprises a conductor 2; an inner layer 3 with semiconductive properties; an intermediate layer 4 with insulating properties; an outer layer 5 with semiconductive properties; a metal shield 6; and an outer sheath 7.

The conductor 2 generally consists of metal wires, preferably copper or aluminium wires, braided together according to conventional techniques.

At least one coating layer chosen from the insulating layer 4 and the semiconductive layers 3 and 5 comprises the composition of the invention as defined above.

Around the outer semiconductive layer 5 is usually placed a shield 6, generally consisting of electrically conductive, helically wound wires or tapes. Said shield is then covered with a sheath 7, consisting of a thermoplastic material, for example non-crosslinked polyethylene (PE) or, preferably, a propylene homopolymer or copolymer as defined above.

The cable can moreover have an outer protective structure (not shown in FIG. 1) whose main function is to protect the cable against mechanical impacts and/or compressions. This protective structure can be, for example, metal armouring or a layer of expanded polymer material, as disclosed in patent application WO 98/52197. In general, this outer protective structure is in a radially internal position relative to the outer sheath 7.

Figure 2:
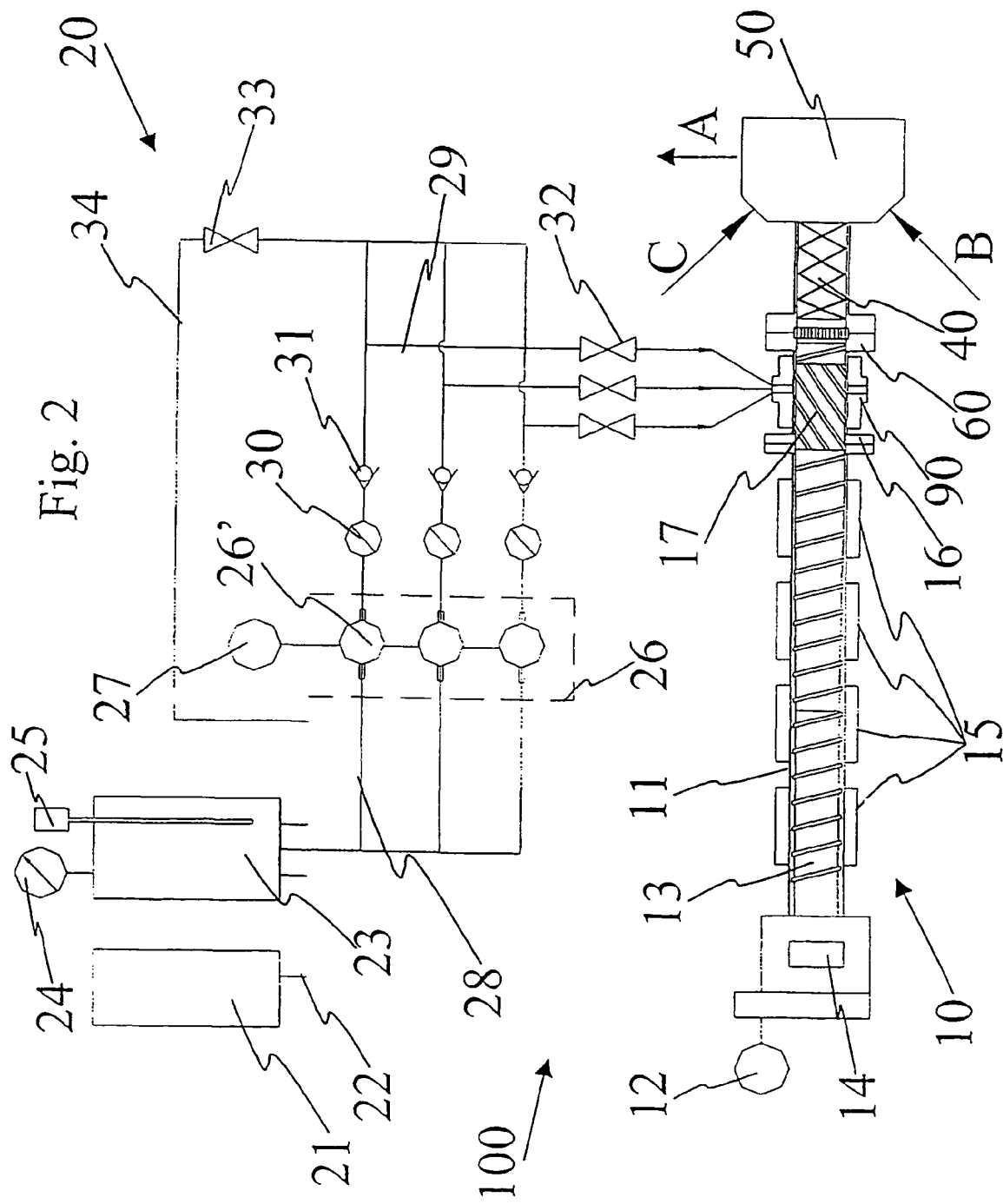
FIG. 2 is a partial top-plan view of a production line according to the invention.

FIG. 2 diagrammatically represents a plant 100 in accordance with one particular embodiment of the process according to the present invention.

In detail, the plant 100 illustrated in FIG. 2 mainly comprises: an extruder 10, a line 20 for supplying the dielectric liquid, a device 90 for feeding the dielectric liquid to the extruder 10, a static mixer 40 and an extrusion head 50, from the outlet of which (arrow A), in accordance with the embodiment illustrated, the so-called "core" of the cable, that is to say the combination of the conductor 2, inner semiconductive layer 3, insulating coating 4 and outer semiconductive layer 5 of the cable 1 in FIG. 1, is obtained.

The extruder 10, shown diagrammatically, comprises a barrel 11 inside of which, via a suitable motor means 12, is rotated a screw 13 provided to process and plasticize the thermoplastic polymer material with which a predetermined coating of the electrical cable 1 is made.

Said polymer material is introduced into the extruder 10 via a feed pipe 14, for example a hopper, and subjected to processing by passing said material into the space between the inner surface of the barrel 11 and the outer surface of the screw 13.

The extruder 10 moreover has a plurality of heating units 15 distributed along the length of the screw 13, which provide the amount of heat required to plasticize the abovementioned polymer material, i.e. to bring it to the molten state.

In the specific embodiment illustrated in FIG. 2, the extruder 10 comprises a further processing unit 17 into which the dielectric liquid is fed. This further processing unit 17 is connected to the extruder 10 by one or more flanges 16.

As mentioned above, the plant 100 also includes a device 90 for feeding in the dielectric liquid. Said device 90 preferably comprises at least one injector. Even more preferably, said device 90 comprises at least one pair of injectors, so as to distribute the dielectric liquid as homogeneously as possible in the molten polymer material.

FIG. 2 diagrammatically illustrates a device 90 comprising three separate injectors located on the same cross section of the extruder 10. Preferably, said three injectors are positioned on the same cross section of the extruder 10 so as to be 120° away from each other.

The line 20 for supplying the dielectric liquid will be described in detail hereinbelow in the present description.

Downstream of the device 90 for feeding in the dielectric liquid, the plant 100 advantageously has a filtration section 60 which, as mentioned above, has the purpose of removing any impurities contained in the thermoplastic polymer material, the presence of which could cause a decrease in the electrical properties of the coating being produced.

In accordance with the present invention, the plant 100 moreover includes a static mixer 40 whose function is to optimize the mixing of the dielectric liquid into the thermoplastic material such that said dielectric liquid can be uniformly distributed throughout the thickness of the coating to be produced.

Finally, downstream of the static mixer 40, the plant 100 includes an extrusion head 50 provided to shape one or more coatings of thermoplastic polymer material around the conductor, the number of said coatings depending on the type of cable being processed.

For example, when the plant 100 in FIG. 2 is intended for the production of the cable 1 shown in FIG. 1, the conductor 2 must be fed through said extrusion head 50, and is generally unwound from a feed reel (not shown in FIG. 2) placed on the line, on which conductor the combination of the inner semiconductive layer 3, the insulating layer 4 and the outer semiconductive layer 5 is deposited, said combination being technically defined by the term "core" of the cable 1.

In order to deposit the abovementioned "core", the extrusion head 50 is advantageously a triple extrusion head, which means that there come together inside it, not only the conductor 2 but also three separate extrusion lines for processing the material which, once deposited on said conductor by means of the preshaping imparted by said head, will lead to the formation of the inner semiconductive layer, the insulating coating and the outer semiconductive layer constituting the abovementioned "core" of the cable.

In the embodiment illustrated in FIG. 2 and provided for the production of the cable 1 in FIG. 1, the extruder 10 of the plant 100 is provided for the processing, according to the present invention, of the thermoplastic material constituting the insulating coating 4 of said cable 1, while the arrows B and C generally indicate the confluence in the triple extrusion head 50 of two separate extrusion lines that produce the inner 3 and outer 4 semiconductive layers respectively.

The arrow A in FIG. 2 indicates the exit from the plant 100 according to the invention of the "core" of the cable 1 as defined above.

In accordance with a different embodiment according to which, as mentioned above, the coating layer obtained by the process according to the invention can also be one or both of the semiconductive layers, the lines for processing and plasticizing the material constituting the abovementioned inner semiconductive layer 3 and outer semiconductive layer 5 (indicated diagrammatically by the arrows B and C) can be entirely analogous to the line shown in detail in FIG. 2 and described above with particular reference to the production of the insulating coating 4 of the cable 1.

Generally, the "core" of the cable thus obtained, leaving the extrusion head 50, is subjected to a cooling step which can be carried out, for example, by passing the abovementioned core through a cooling channel, in which is placed a suitable fluid, typically well water or water cooled to a temperature of about 12-15° C.

After a drying step, the "core" of the cable is usually subjected to successive steps of coating with other elements typically present in a power cable.

In particular, with reference to the cable in FIG. 1, the "core" of the cable is stored on a suitable reel and conveyed to a line to apply the metal shield 6. This shield is generally obtained by means of a tape screening machine, which helically places thin strips of copper (about 0.1-0.2 mm thick), via suitable rotating heads, preferably by overlapping-the edges of said strips of about 33% of their surface. Alternatively, the metal shield consists of a plurality of copper wires helically applied onto the cable core.

The cable 1 is then completed by applying, for example by extrusion, the outer polymer sheath 7 placed over the metal shield 6.

FIG. 2 moreover shows a possible layout of the line 20 for supplying the dielectric liquid which forms a part of the plant 100 according to the present invention.

In greater detail, said line 20 comprises a first feed tank 21 in which is stored, and refilled as it is consumed, the dielectric liquid used in the plant 100. Said tank 21 is connected, via a line 22, to a second working tank 23.

The presence of two different tanks is particularly advantageous since it makes possible to feed the line 20 with the dielectric liquid at a substantially constant working pressure. Specifically, whenever fresh dielectric liquid is fed into the first tank 21 to top up the level, the pressure inside said first tank needs to be brought to the desired working value. The presence of a second tank 23, not connected to the first tank 21, thus makes it possible to have in said second tank 23 dielectric liquid always at the working pressure, said dielectric liquid at the required pressure being transferred from the first tank 21 to the second tank 23 only when the first tank 21, once loaded, has been brought to the desired working pressure.

In order to ensure a suitable regulation of the dielectric liquid flow to be released into the line 20, the second tank 23 is provided with a suitable instrumentation, such as a manometer 24 and a thermocouple 25, as well as a level-measuring device (not shown) and an exhaust valve (not shown) which is automatically actuated in the event of there being an excess pressure inside the second tank 23.

The dielectric liquid leaving the second tank 23 is fed into a pump 26 actuated by a motor means 27. Said pump 26 is preferably a membrane pump.

Advantageously, and as illustrated in FIG. 2, the pump 26 has three separate pumping heads 26'. Each pumping head 26', provided with a separate inlet line 28 and with a separate outlet line 29, is intended to make the dielectric liquid flow towards the feed device 90 mentioned above. As represented diagrammatically, said device 90 consists of three separate injectors, each of which is connected to a different outlet line 29 of the pumping heads 26'.

Each outlet line 29 is also provided with a manometer 30 (to monitor the pressure of the dielectric liquid in the line), a non-return valve 31 and a valve 32, the latter valve being intended to separate the line 20 from the rest of the plant 100.

In greater detail, the presence of said valve 32 on each line 29 ensures that, especially when the plant 100 is started, the dielectric liquid is fed into the device 90 at the correct working pressure. Specifically, by closing the valves 32 on each line 29 and opening the valve 33 located on the recycling line 34 toward the second tank 23, the line 20 is separated from the rest of the plant 100. This operating situation is maintained until the pressure of the dielectric liquid reaches the desired value, at which time the valve 33 can be closed and the valves 32 can be opened.

When it is desired to produce a multipolar cable, the process hitherto described for a unipolar cable can be appropriately modified on the basis of the indications given and the technical knowledge of a person skilled in the art.

A number of preparation examples will now be given to describe the invention in further detail.

EXAMPLE 1

A medium-tension cable of the type illustrated in FIG. 1 was produced.

The production line used had the configuration illustrated in FIG. 2, and comprised three separate extruders flowing together in a triple extrusion head so as to obtain the co-deposition of the semiconductive coatings and of the insulating coating to form the cable core.

Into the downstream zone of the extruder used to deposit the insulating layer were inserted three injectors positioned on the same cross section at 120° from each other, connected as illustrated in FIG. 2 to a line for feeding in the dielectric liquid.

At the extruder outlet, downstream of the filtration section, was placed a static mixer for injection-moulding use, from the company Sulzer, model SMK-R 30, having an inside diameter of 30.1 mm, an outside diameter of 45 mm and comprising 4 mixing elements in series with a total length of 135.5 mm.

By using this plant, a Cu/Sn conductor (consisting of a plurality of wires braided together to form a cross section of 70 mm$^2$) was coated with:

an inner semiconductive layer 0.5 mm thick;
an insulating layer 5.5 mm thick;
an outer semiconductive layer 0.5 mm thick.

The material of which both the semiconductive layers was made had the following composition:

| | |
|---|---|
| Hifax ® KS 081 | 100 phr |
| Carbon black Y-200 | 55 phr |
| Jarylec ® EXP3 | 10 phr |
| Irganox ® 1330 | 0.4 phr | in which:

Hifax® KS 081: heterogeneous propylene copolymer, with a content of ethylene/propylene elastomeric phase equal to about 65% by weight (72% by weight of propylene in the elastomeric phase), a heat of fusion of 32 J/g, a melting point of 163° C., a MFI of 0.8 dg/min and a flexural modulus of about 70 MPa (commercial product from Montell);

Jarylec® EXP3: dibenzyltoluene (DBT) (commercial product from Elf Atochem);

Black Y-200: acetylene carbon black from the company SN2A, with a specific surface area of 70 m$^2$/g;

Irganox® 1330: 1,3,5-trimethyl-2,4,6-tris-(3,5-di-tert-butyl-4-hydroxybenzyl)benzene (antioxidant from Ciba Geigy).

The term "phr" means parts by weight of each component per 100 parts by weight of polymer.

This material was prepared by mixing the components together in a Werner internal mixer (internal volume: 6000 cm$^3$) for 10 min at 200° C. (rotor speed: 44 rpm).

A 45 mm Bandera single-screw extruder in configuration 20 D, having three zones of temperature regulation with diathermic oil, was used for the inner semiconductive layer, and a 60 mm Bandera single-screw extruder in configuration 20 D was used for the outer semiconductive layer. The temperature profile of each extruder is given in Table 1.

The insulating layer consisted of a thermoplastic material comprising Rexflex® WL105 and 7.5% by weight of Jarylec® EXP3, in which:

Rexflex® WL105: propylene-homopolymer, having a melting point of 160° C., a heat of fusion of 56.7 J/g, a MFI of 1.8 dg/min and an elastic flexural modulus of 290 MPa (commercial product from Huntsman Polymer Corp.);

Jarylec® EXP3: as above.

The insulating layer was extruded by using a 100 mm Bandera single-screw extruder in configuration 25 D, having a temperature profile as given in Table 1.

TABLE 1

| Zone of the extruder | Inner semiconductive layer (° C.) | Insulating layer (° C.) | Outer semiconductive layer (° C.) |
|---|---|---|---|
| Zone 1 | 170 | 150 | 160 |
| Zone 2 | 180 | 170 | 170 |
| Zone 3 | 190 | 180 | 180 |
| Zone 4 | — | 180 | 190 |
| Zone 5 | — | 190 | — |
| Extruder/head flange | 200 | 190 | 200 |
| Die | | 190 | |

The following tests were carried out on the cable thus obtained.

Distribution of the Dielectric Liquid in the Insulating Layer.

Figure 3:
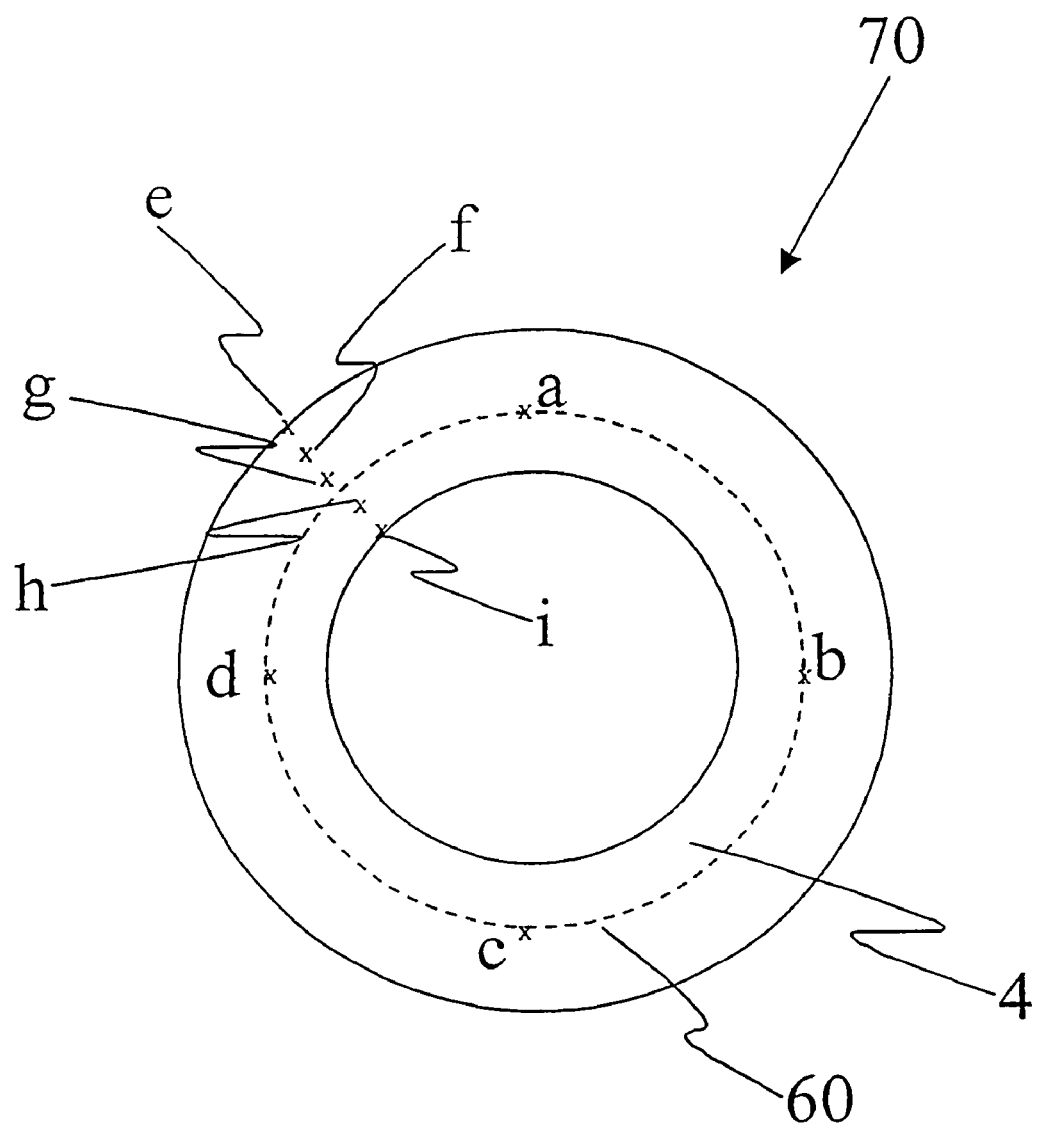
FIG. 3 is a partial cross section of an insulating layer of a Dower cable, in which cross section are shown the points where the concentration of the dielectric liquid was determined.

Samples in the shape of slices (indicated by 70 in FIG. 3) 150 µm thick were cut from a cross-section of the cable by using a microtome and were analysed by quantitative infrared spectroscopy (macro FTIR) in order to determine the amount and the distribution of the dielectric liquid in the material. In particular, by using the typical absorption bands of the dielectric liquid (aromatic rings at 696 cm$^{-1}$) and of polypropylene (alkyl branches at 901 cm$^{-1}$) as reference, calibration curves were used to determine the concentration of the dielectric liquid at, respectively:

four points (identified by the letters a-d in FIG. 3) placed at 90° from each other and located on the same circumference 60 of the insulating layer 4, and thus at the same distance from the conductor;

five points (identified by the letters e-h in FIG. 3) located adjacent to each other, about 1 mm apart, on the same radius defining the thickness of the insulating layer 4.

The results obtained are given in Table 2.

Measurement of the Dielectric Rigidity of the Cable

From the cable obtained as above were cut three pieces, each with a useful length of 20 m. Said pieces were subjected to a test of dielectric rigidity by using a voltage alternating at industrial frequency (50 Hz), at ambient temperature. A gradually increasing voltage was applied between the conductor and the earthed metal shield. In detail, by starting from an initial value of 0 kV, the voltage was gradually increased every 10 min by an amount of 10 kV until perforation of the insulating layer occurred. The results of this test (as the average of the three pieces of cable) are given in Table 2.

EXAMPLE 2

A medium-tension cable was produced as described in Example 1, the only difference being that the insulating layer consisted of a thermoplastic material comprising Hifax® KS 081 and 6.5% by weight of Jarylec® EXP3.

The same tests as in Example 1 were carried out on the cable thus produced. The results are given in Table 2.

EXAMPLE 3

A medium-tension cable was produced as described in Example 1, the only difference being that the insulating layer consisted of a thermoplastic material comprising Hifax® KS 081 and 9% by weight of Jarylec® EXP3.

A dielectric rigidity measurement was carried out on the cable thus produced, as described in Example 1. The results are given in Table 2.

EXAMPLE 4 (COMPARATIVE)

A medium-tension cable was produced as described in Example 1, the only differences being that the production plant did not comprise a static mixer and the amount of additive in the insulating material was equal to 4% by weight.

The same tests as in Example 1 were carried out on the cable thus produced. The results are given in Table 2.

EXAMPLE 5 (COMPARATIVE)

A medium-tension cable was produced as described in Example 1, the only differences being that the production plant did not comprise a static mixer and both the insulating layer and the semiconductive layers did not comprise dielectric liquid.

A measurement of dielectric rigidity was carried out on the cable thus produced, as described in Example 1. The results are given in Table 2.

From the data given in Table 2, the following can be noted.

Firstly, it can be deduced that the process according to the present invention makes it possible to achieve a uniform distribution of the dielectric liquid both circumferentially relative to the cable conductor and radially in the thickness of the thermoplastic polymer coating comprising said dielectric liquid. Said result is not obtained when (see Example 4) the process for producing this cable is carried out without a static mixer.

Secondly,, Table 2 demonstrates the relationship which exists between the dielectric rigidity and the distribution of the dielectric liquid: specifically, obtaining a uniform distribution of the dielectric liquid in the coating layer of the cable (see Examples 1 and 2) increases the dielectric rigidity of the cable.

TABLE 2

|  | EXAMPLE | | | | |
| --- | --- | --- | --- | --- | --- |
|  | 1 | 2 | 3 | 4 (*) | 5 (*) |
| Dielectric rigidity (kV/mm) | 45.3 | 53.6 | 61 | 28.9 | 28.2 |
| Distribution of the dielectric liquid (%) | | | | | |
| Point a | 7.5 | 6.4 | n.m. | 1.2 | — |
| b | 7.2 | 6.7 | | 4.0 | — |
| c | 6.9 | 6.7 | | 3.4 | — |

TABLE 2-continued

|  | EXAMPLE | | | | |
| --- | --- | --- | --- | --- | --- |
|  | 1 | 2 | 3 | 4 (*) | 5 (*) |
| d | 7.2 | 6.7 | | 3.9 | — |
| e | 7.6 | 7.9 | | 1.8 | — |
| f | 7.8 | 6.7 | | 3.2 | — |
| g | 7.5 | 6.3 | | 3.7 | — |
| h | 7.3 | 6.5 | | 4.4 | — |
| i | 7.5 | 8.0 | | 2.8 | — |

(*): comparative
n.m.: not measured

What is claimed is:

1. A process for producing a cable provided with at least one thermoplastic coating comprising:
   providing at least one thermoplastic polymer and at least one dielectric liquid;
   feeding said at least one thermoplastic polymer into at least one extruder;
   conveying said at least one thermoplastic polymer through said at least one extruder;
   plasticizing said at least one thermoplastic polymer traveling through said at least one extruder;
   adding said at least one dielectric liquid to said at least one thermoplastic polymer in a zone of said at least one extruder, wherein said at least one thermoplastic polymer is in a molten state, to form a thermoplastic material, wherein said at least one dielectric liquid is distributed substantially uniformly within said at least one thermoplastic polymer;
   passing said thermoplastic material through at least one static mixer; and
   extruding said thermoplastic material around a conductor so as to obtain a layer of thermoplastic coating on said conductor.

2. The process according to claim 1, wherein said dielectric liquid is also added to said at least one thermoplastic polymer in the solid state.

3. The process according to claim 1, wherein said dielectric liquid is added in at least two separate points of said zone of said at least one extruder.

4. The process according to claim 2, wherein said dielectric liquid is added to said at least one thermoplastic polymer during said feeding sub-step.

5. The process according to claim 2, wherein said dielectric liquid is added to said at least one thermoplastic polymer before said feeding sub-step.

6. The process according to claim 2, wherein said dielectric liquid is added in at least one zone of said at least one extruder in which said at least one thermoplastic polymer is in the solid state.

7. The process according to claim 1, further comprising filtering said thermoplastic material prior to said step of passing said thermoplastic material through at least one static mixer.

8. The process according to claim 1, further comprising filtering said thermoplastic material after said step of passing said thermoplastic material through at least one static mixer.

9. The process according to claim 1, wherein said at least one thermoplastic coating is a layer of electrical insulation.

10. The process according to claim 1, wherein said at least one thermoplastic coating is a semiconductive layer.

11. The process according to claim 1, wherein said thermoplastic material comprises at least one polyolefin.

12. The process according to claim 11, wherein said polyolefin has an elastic flexural modulus, measured according to ASTM standard D790 at ambient temperature, of between 30 and 1400 MPa.

13. The process according to claim 12, wherein said elastic flexural modulus is between 60 and 1000 MPa.

14. The process according to claim 11, wherein said polyolefin has a melt flow index (MFI), measured at 230° C. under a 21.6 N load according to ASTM standard D1238/L, of between 0.05 and 10.0 dg/min.

15. The process according to claim 14, wherein said melt flow index is between 0.5 and 5.0 dg/min.

16. The process according to claim 11, wherein said polyolefin is:
  a) a high-density polyethylene (HDPE) with a density of between 0.93 g/cm$^3$ and 0.96 g/cm$^3$; or
  b) a propylene homopolymer or a copolymer of propylene with at least one olefinic comonomer chosen from ethylene and an α-olefin other than propylene, said homopolymer or copolymer having a melting point greater than or equal to 140° C. and a heat of fusion of from 30 to 100 J/g.

17. The process according claim 1, wherein said dielectric liquid is an aromatic oil, an aliphatic oil, or an aliphatic and aromatic oil with a dielectric constant (measured at 25° C. according to IEC standard 247) of not greater than 8.

18. The process according to claim 17, wherein said dielectric constant is less than 3.5.

19. The process according to claim 17, wherein said dielectric liquid is:
  (i) an alkylaryl hydrocarbon containing at least two, non-fused aromatic rings and having a ratio between the number of aryl carbon atoms and the total number of carbon atoms of greater than or equal to 0.6;
  (ii) a diphenyl ether, which is unsubstituted or substituted with at least one linear or branched aliphatic, aromatic or mixed aliphatic and aromatic hydrocarbon radical, containing from 1 to 30 carbon atoms, or
  (iii) a mixture of (i) and (ii).

20. The process according to claim 1, further comprising adding an epoxy resin to said dielectric liquid before said extruding step.

21. The process according to claim 20, wherein said epoxy resin is added in an amount of not greater than 1% by weight relative to the weight of said dielectric liquid.

22. The process according to claim 1, wherein the weight ratio between said dielectric liquid and said at least one thermoplastic polymer is between 1:99 and 25:75.

23. The process according to claim 22, wherein said weight ratio is between 2:98 and 20:80.

24. The process according to claim 23, wherein said weight ratio is between 3:97 and 15:85.

* * * * *